United States Patent
Oshry et al.

(10) Patent No.: US 11,991,245 B1
(45) Date of Patent: May 21, 2024

(54) COMPLIANT AND OPTIMIZED PEER DATA GENERATION

(71) Applicant: MASTERCARD INTERNATIONAL INCORPORATED, Purchase, NY (US)

(72) Inventors: Steven Bruce Oshry, Tarrytown, NY (US); Alexander Joseph Franz, Purcellville, NY (US)

(*) Notice: Subject to any disclaimer, the term of this patent is extended or adjusted under 35 U.S.C. 154(b) by 0 days.

(21) Appl. No.: 18/450,485

(22) Filed: Aug. 16, 2023

(51) Int. Cl.
*H04L 67/1074* (2022.01)
*G06N 3/08* (2023.01)
*H04L 41/16* (2022.01)
*H04N 21/466* (2011.01)

(52) U.S. Cl.
CPC .......... *H04L 67/1076* (2013.01); *G06N 3/08* (2013.01); *H04L 41/16* (2013.01); *H04N 21/4662* (2013.01)

(58) Field of Classification Search
CPC ........ H04L 67/1076; H04L 41/16; G06N 3/08
See application file for complete search history.

(56) References Cited

U.S. PATENT DOCUMENTS

| | | | | |
|---|---|---|---|---|
| 2021/0125089 A1* | 4/2021 | Nickl | ................... | H04W 12/02 |
| 2022/0344049 A1* | 10/2022 | Hall | ................... | G06N 3/0464 |
| 2023/0153461 A1* | 5/2023 | Kalra | ................... | G06F 21/6245 |
| | | | | 726/27 |

FOREIGN PATENT DOCUMENTS

CN       117033997       * 11/2023

* cited by examiner

*Primary Examiner* — Aftab N. Khan
(74) *Attorney, Agent, or Firm* — Kristin A. Grant; Grant Attorneys at Law (57) ABSTRACT

Systems, methods, and apparatus are described herein data extraction and analysis, and more particularly, to the generation of compliant and optimized peer data.

20 Claims, 10 Drawing Sheets

| merchant | sales | Sales % |
|---:|---:|---:|
| 1 | $12,356,575 | 88% |
| 2 | $845,914 | 6% |
| 3 | $244,736 | 2% |
| 4 | $236,449 | 2% |
| 5 | $121,858 | 1% |
| 6 | $93,753 | 1% |
| 7 | $33,110 | 0% |
| 8 | $20,472 | 0% |
| 9 | $20,411 | 0% |
| 10 | $10,000 | 0% |
| 11 | $7,903 | 0% |
| 12 | $6,851 | 0% |
| 13 | $4,711 | 0% |
| 14 | $2,971 | 0% |
| 15 | $1,313 | 0% |
| 16 | $390 | 0% |
| 17 | $320 | 0% |
| 18 | $226 | 0% |
| 19 | $170 | 0% |
| 20 | $122 | 0% |
| | | |
| Total | $14,008,255 | 100% |

| | Estimate | Actual | Merchant 1 (Actual) |
|---|---|---|---|
| 4/1/22 | 67.97% | 67.97% | 96.21% |
| 4/2/22 | 101.56% | 101.56% | 142.63% |
| 4/3/22 | 148.42% | 148.42% | 106.56% |
| 4/4/22 | 31.93% | 31.93% | 83.53% |
| 4/5/22 | 54.45% | 54.45% | 57.56% |
| 4/6/22 | 62.11% | 62.11% | 69.85% |
| 4/7/22 | 23.00% | 23.00% | 54.35% |
| 4/8/22 | 73.73% | 73.73% | 73.75% |
| 4/9/22 | 76.20% | 76.20% | 68.63% |
| 4/10/22 | 82.70% | 82.70% | 106.60% |
| 4/11/22 | 65.29% | 65.29% | 81.87% |
| 4/12/22 | 103.29% | 103.29% | 131.77% |
| 4/13/22 | 87.38% | 87.38% | 88.37% |
| 4/14/22 | 57.90% | 57.90% | 76.50% |
| 4/15/22 | 86.33% | 86.33% | 107.26% |
| 4/16/22 | 67.25% | 67.25% | 84.59% |
| 4/17/22 | 64.99% | 64.99% | 75.50% |
| 4/18/22 | 72.93% | 72.93% | 72.02% |
| 4/19/22 | 128.05% | 128.05% | 135.65% |
| 4/20/22 | 98.13% | 98.13% | 151.04% |

| | Estimate | Actual | Merchant 1 (Actual) |
|---|---|---|---|
| 4/1/22 | -9.50% | 67.97% | 96.21% |
| 4/2/22 | 6.98% | 101.56% | 142.63% |
| 4/3/22 | 388.52% | 148.42% | 106.56% |
| 4/4/22 | -45.41% | 31.93% | 83.53% |
| 4/5/22 | 19.47% | 54.45% | 57.56% |
| 4/6/22 | 22.25% | 62.11% | 69.65% |
| 4/7/22 | -46.11% | 23.00% | 54.15% |
| 4/8/22 | 53.66% | 73.73% | 73.75% |
| 4/9/22 | 78.77% | 76.20% | 68.63% |
| 4/10/22 | 21.06% | 82.70% | 106.60% |
| 4/11/22 | 5.45% | 65.29% | 81.87% |
| 4/12/22 | 6.13% | 101.29% | 131.77% |
| 4/13/22 | 58.43% | 87.38% | 88.37% |
| 4/14/22 | -3.79% | 57.90% | 76.50% |
| 4/15/22 | 39.19% | 86.33% | 107.26% |
| 4/16/22 | 8.92% | 67.25% | 84.59% |
| 4/17/22 | -16.37% | 64.99% | 75.50% |
| 4/18/22 | 50.74% | 72.93% | 72.02% |
| 4/19/22 | 68.74% | 128.05% | 135.65% |
| 4/20/22 | -6.69% | 98.13% | 151.04% |
| 4/21/22 | 69.80% | 155.46% | 175.45% |
| 4/22/22 | 37.21% | 72.41% | 75.86% |
| 4/23/22 | -32.39% | 36.69% | 64.37% |

COMPLIANT AND OPTIMIZED PEER DATA GENERATION

BACKGROUND

Antitrust enforcement authorities may monitor an exchange of competitively sensitive information among competitors. When the information exchange is likely to have anticompetitive effects, the antitrust enforcement authorities may issue an enforcement action to address antitrust violations. For an entity to avoid potential antitrust violations and be compliant with Privacy and Data Protection Laws, the entity may perform the information exchange according to a safe harbor provision. The safe harbor provision may include a third party managing the exchange of information, the information being older than three months, and the third party aggregating the information before disseminating statistics on the information. For the third party to provide a statistic on the information, the third party must aggregate the information from a certain number of participants, in which an individual participant's data may not constitute more than a percentage of the statistic on a weighted basis. Moreover, the aggregation of information must be sufficient to prevent a participant from deducing the data provided by any individual competitor. However, conventional data extraction and analysis products typically rely on peer data (i.e., aggregated information) to produce metrics based on categories, time periods, geographies, channels, and the like. As the need for granularity increases with respect to time period, geographic region, and categories, the likelihood that peer data no longer complies with the safe harbor provision increases.

SUMMARY

The disclosure relates generally to data extraction and analysis, and more particularly, to the generation of compliant and optimized peer data.

The summary of the disclosure is given to aid understanding of generating compliant and optimized peer data using machine learning and not with an intent to limit the disclosure. The present disclosure is directed to a person of ordinary skill in the art. It should be understood that various aspects and features of the disclosure may advantageously be used separately in some instances, or in combination with other aspects and features of the disclosure in other instances.

Accordingly, variations and modifications may be made to the systems, devices, and their methods of operation to achieve different effects. Certain aspects of the present disclosure provide a system, method, and non-transitory computer readable medium for generating compliant and optimized peer data.

Systems, methods, and apparatus are described herein for generating compliant and optimized peer data. In one or more aspects, the disclosed technology relates to a method. In one or more cases, the method determines training data associated with a group of peers and a time period. The group of peers include one or more comparable attributes. The training data includes one or more metrics. In one or more cases, the method aggregates the training data associated with each peer of the peer group to determine a share of the metric associated with each peer of the peer group. In one or more cases, the method determines compliance data based on the aggregated training data. The compliance data is associated with a constraint that limits a weighted contribution of aggregated training data associated with one peer. In one or more cases, the method applies the constraint of aggregated training data associated with the peer to limit the weighted contribution of aggregated training data associated with the peer to determine compliant peer data. In one or more cases, the method determines weighted contributions of aggregated training data associated with the remaining peers of the peer group. In one or more cases, the method generates and provides the compliant peer data to an application. The compliant peer data is generated based on the limited weighted contribution of aggregated training data associated with the peer and the weighted contributions of aggregated training data associated with the remaining peers of the peer group. The application is configured to display the compliant peer data.

In one or more aspects, the disclosed technology relates to a compliance apparatus to generate compliant and optimized peer data. In one or more cases, the compliance apparatus comprises a memory configured to store instructions, and at least one processor coupled to the memory and configured to execute the instructions. In one or more cases, the at least one processor is configured to determine training data associated with a group of peers and a time period. The group of peers include one or more comparable attributes. The training data includes one or more metrics. In one or more cases, the at least one processor is configured to aggregate the training data associated with each peer of the peer group to determine a share of the metric associated with each peer of the peer group. In one or more cases, the at least one processor is configured to determine compliance data based on the aggregated training data. The compliance data is associated with a constraint that limits a weighted contribution of aggregated training data associated with one peer. In one or more cases, the at least one processor is configured to apply the constraint of aggregated training data associated with the peer to limit the weighted contribution of aggregated training data associated with the peer to determine compliant peer data. In one or more cases, the at least one processor is configured to determine weighted contributions of aggregated training data associated with the remaining peers of the peer group. In one or more cases, the at least one processor is configured to generate and provide the compliant peer data to an application. The compliant peer data is generated based on the limited weighted contribution of aggregated training data associated with the peer and the weighted contributions of aggregated training data associated with the remaining peers of the peer group.

The application is configured to display the compliant peer data.

In one or more aspects, the disclosed technology relates to a computer program product comprising a non-transitory computer readable medium having program instructions stored thereon. In one or more cases, the program instructions are executable by one or more processors. In one or more cases, the program instructions comprise determining training data associated with a group of peers and a time period. The group of peers have one or more comparable attributes. The training data comprise one or more metrics. In one or more cases, the program instructions comprise aggregating the training data associated with each peer of the peer group to determine a share of the metric associated with each peer of the peer group. In one or more cases, the program instructions comprise determining compliance data based on the aggregated training data. The compliance data is associated with a constraint that limits a weighted contribution of aggregated training data associated with one peer. In one or more cases, the program instructions comprise applying the constraint of aggregated training data associated with the peer to limit the weighted contribution of aggregated training data associated with the peer to determine compliant peer data. In one or more cases, the program instructions comprise determining weighted contributions of aggregated training data associated with the remaining peers of the peer group. In one or more cases, the program instructions comprise generating and providing the compliant peer data to an application. The compliant peer data is generated based on the limited weighted contribution of aggregated training data associated with the peer and the weighted contributions of aggregated training data associated with the remaining peers of the peer group. The application is configured to display the compliant peer data.

BRIEF DESCRIPTION OF THE DRAWINGS

The features and advantages of the present disclosure will be better understood when read in conjunction with the figures provided. Embodiments are provided in the figures for the purpose of illustrating aspects, and/or features, of the various embodiments, but the claims should not be limited to the precise arrangements, structures, features, aspects, methods, processes, assemblies, systems, or devices shown, and the arrangements, structures, features, aspects, methods, processes, assemblies, systems, and devices shown may be used singularly or in combination with other arrangements, structures, features, aspects, methods, processes, assemblies, systems, and devices.

DETAILED DESCRIPTION

The following discussion omits or only briefly describes conventional features of the data processing environment, which are apparent to those skilled in the art. It is noted that various embodiments are described in detail with reference to the drawings, in which like reference numerals represent like drawing elements throughout the figures. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. The objectives and advantages of the claimed subject matter will become more apparent from the following detailed description of these embodiments in connection with the accompanying drawings.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Embodiments of the disclosure relate generally to data extraction and analysis, and more particularly, to the generation of compliant and optimized peer data. Embodiments that provide compliant and optimized peer data are described below with reference to the figures.

Figure 1:
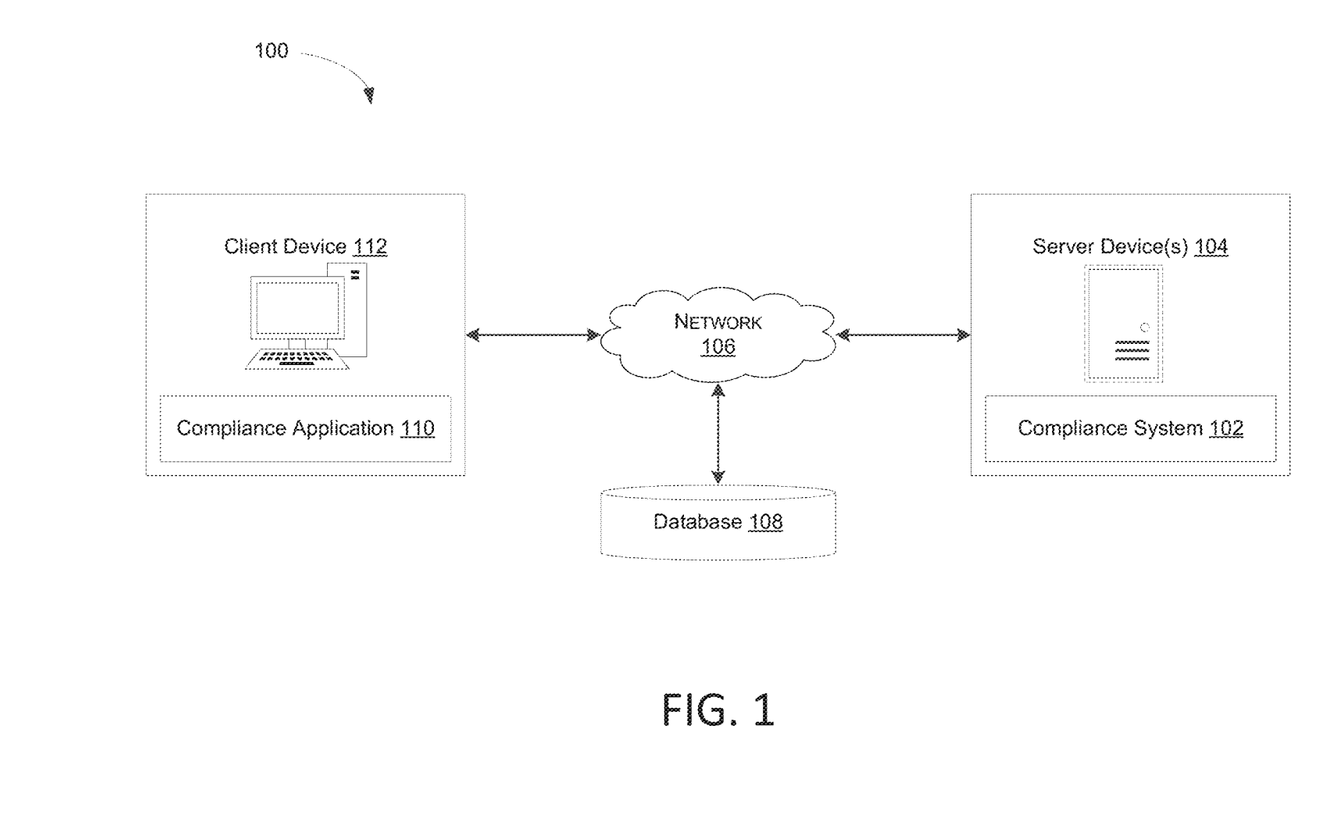
FIG. 1 illustrates a functional block diagram of a data processing environment.

FIG. 1 is a functional block diagram of a data processing environment 100. FIG. 1 provides only an illustration of one implementation and does not imply any limitations with regard to the environments in which different embodiments may be implemented. Many modifications of the depicted environment may be made by those skilled in the art without departing from the scope of the claims. In one or more cases, the data processing environment 100 includes one or more server device(s) 104, which operates a compliance system 102, a database 108, and one or more computing devices, such as client device 112, coupled over a network 106. The server device(s) 104, compliance system 102, database 108, and client device 112 can each be any suitable computing device that includes any hardware or hardware and software combination for processing and handling information, and transmitting and receiving data among the server device(s) 104, compliance system 102, database 108, and client device 112. The server device(s) 104, compliance system 102, database 108, and client device 112 can each include one or more processors, one or more field-programmable gate arrays (FPGAs), one or more application-specific integrated circuits (ASICs), one or more state machines, digital circuitry, or any other suitable circuitry.

The server device(s) 104, the client device 112, and the database 108 may communicate with each other via the network 106. In general, the network 106 can be any combination of connections and protocols capable of supporting communication between the server device(s) 104, the database 108, the client device 112, and the compliance system 102. For example, the network 106 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. In one or more cases, the network 106 may include wire cables, wireless communication links, fiber optic cables, routers, switches, firewalls, or any combination that can include wired, wireless, or fiber optic connections known by those skilled in the art. Though FIG. 1 illustrates the components of environment 100 communicating via the network 106, it will be appreciated that the components of environment 100 may communicate directly with each other, for example, bypassing the network 106. For example, the client device 112 may communicate directly with the server device(s) 104 and compliance system 102.

In one or more cases, the server device(s) 104 hosts the compliance system 102. In some cases, the server device(s) 104 may be a web server, a blade server, a mobile computing device, a laptop computer, a tablet computer, a netbook computer, a personal computer (PC), a desktop computer, or any programmable electronic device or computing system capable of receiving and sending data, via the network 106, and performing computer-readable program instructions. In one or more cases, the server device(s) 104 may communicate with the client device 112. For example, the server device(s) 104 may send data to the client device 112, including peer data or other information, and the server device(s) 104 may receive input from the user via client device 112. In some cases, the server device(s) 104 may include a distributed collection of servers, in which the server device(s) 102 include a number of server devices distributed across the network 106. In some examples, the distributed server device(s) 104 may be located in the same location or at different physical locations. In other cases, the server device(s) 104 may comprise a content server, an application server, a communication server, a web-hosting server, or another type of server.

The environment 100 may be included in a local network or local high-performance computing (HPC) system. In one or more other cases, the environment 100 may be included in a cloud computing environment comprising a plurality of server devices, such as server device(s) 104, having software and/or data distributed thereon. In one or more cases, the compliance system 102 may be distributed across server devices 104 having access to the database 108 via the network 106 in a cloud-based computing system.

The client device 112 may generate, store, receive, and/or send digital data for enabling the generation of compliant and optimized peer data via the processes and analysis described herein. For example, the client device 112 may receive peer metrics from the compliance system 102. The client device 112 may communicate with the server device(s) 104 to receive one or more files comprising peer metrics and/or other metrics. In one or more cases, the client device 112 may present or display information pertaining to the peer metrics within a graphical user interface of a compliance application 110 of the client device 112 to a user.

The client device 112 may comprise various types of client devices. In some examples, the client device 112 may be a non-mobile device, such as desktop computer, server, or the like. In other examples, the client device 112 may be a mobile device, such as a laptop, tablet, mobile telephone, smartphone, or the like.

The client device 112 may include compliance application 110. The compliance application 110 may be, for example, a web application or a native application (e.g., a mobile application, desktop application) stored and executed on the client device 112. In one or more cases, the compliance application 110 may include instructions that (when executed) cause the client device 112 to receive data from the compliance system 102 and present within a graphical user interface of the client device 112, data, such as, but not limited to peer data.

The client device 112 includes a user interface for providing an end user with the capability to interact with the compliance system 102. For example, an end user of the client device 112 may access the compliance system 102 through the user interface of the compliance application 110 to interact with the complaint and optimized peer data. A user interface refers to the information (such as graphic, text, and sound) a program presents to a user and the control sequences the user employs to control the program. The user interface can be a graphical user interface (GUI). A GUI may allow users to interact with electronic devices, such as a keyboard and mouse, through graphical icons and visual indicators, such as secondary notations, as opposed to text-based interfaces, typed command labels, or text navigation. For example, the GUI may allow users to view, access, and interact with a website hosted on the server device(s) 104.

In one or more cases, the database 108 may store data including, but not limited to, peer metric data, compliance data, aggregated peer data, compliant peer data, and the like. The database 108 may be one of, a web server, a mobile computing device, a laptop computer, a tablet computer, a netbook computer, a personal computer (PC), a desktop computer, or any programmable electronic device or computing system capable of receiving, storing, sending data, and performing computer readable program instructions capable of communicating with the server device(s) 104, and client device 112, via network 106. In one or more cases, the database 108 may represent virtual instances operating on a computing system utilizing clustered computers and components (e.g., database server computer, application server computers, etc.) that act as a single pool of seamless resources when accessed within data processing environment 100. In one or more cases, the database 108 may be a remote storage device. In one or more other cases, the database 108 may be a local storage device on the server device(s) 104. For example, the database 108 may be, but not limited to, a hard drive, non-volatile memory, or a USB stick.

Figure 2:
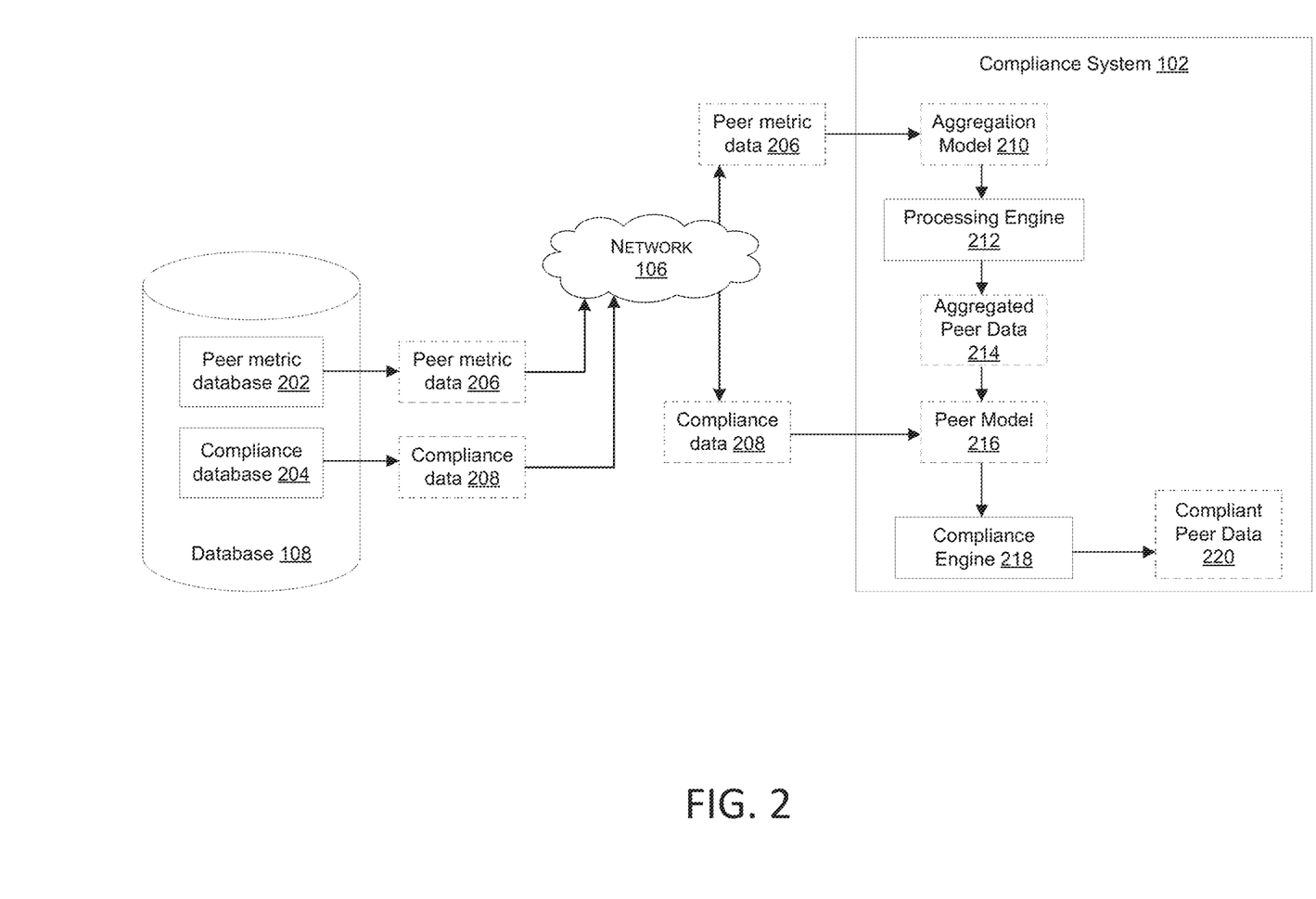
FIG. 2 illustrates a functional block diagram illustrating components of the data processing environment of FIG. 1.

FIG. 2 illustrates a functional block diagram illustrating components of the data processing environment 100 of FIG. 1.

In one or more cases, the database 108 includes one or more databases for storing information, such as training data. For example, the database 108 may include a peer metric database 202 and a compliance database 204.

Figure 3A:
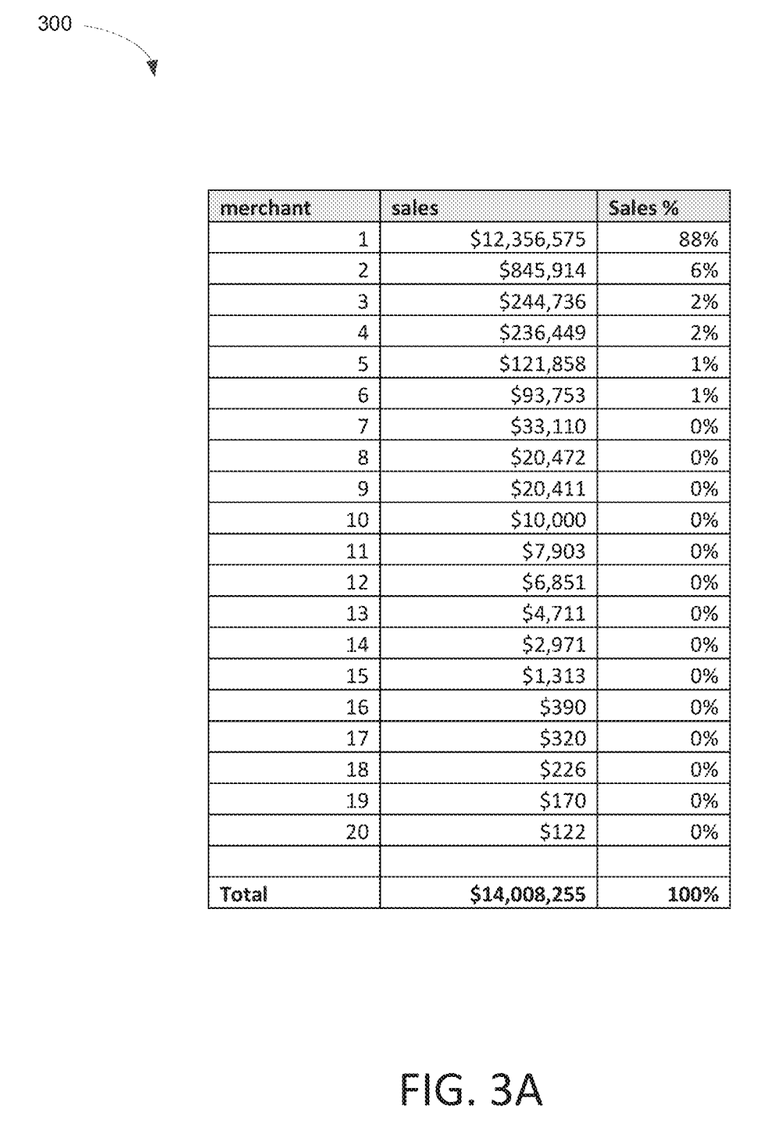
FIG. 3A is a table that illustrates example merchants and their respective sales and market share in a time period.

The peer metric database 202 may store peer metric data 206. Peer metric data 206 may correspond to attributes of an entity, such as a merchant, and/or an individual. For example, attributes of a merchant may include, but are not limited to, geographic locations of the merchants, size of merchants (e.g., big box stores, mom-and-pop stores, and the like), types of merchants (e.g., wholesale merchants, retail merchants, e-commerce merchants, affiliate merchants, and the like), types of goods and/or services offered (e.g., electronic stores, grocery stores, legal services, banking services, healthcare provider services, and the like), merchant categories, information associated with sale transactions, and the like. In one or more cases, the peer metric data 206 may correspond to various time periods associated with the entity. For example, the peer metric data 206 may be associated with sales transactions of merchants within a peer group for the prior year, transaction for one or more sales quarters, and the like. For instance, FIG. 3A illustrates peer metric data in table 300 that includes example peer merchants (e.g., merchant 1 to merchant 20) and their respective total amount of sales for the second quarter of previous year. Additionally, the peer metric data of table 300 illustrates the corresponding market share occupied by the respective merchant for the particular time period. For instance, merchant 1 had a market share of 88% of the sales that were conducted in the second quarter for this peer group of merchants.

The compliance database 204 may store compliance data 208. The compliance data 208 may be associated with one or more constraints to limit a maximum weighted contribution of aggregated peer data associated with one or more peers of the peer group. Compliance data 208 corresponding to a first constraint may, for example, indicate that the peer group includes at least five participants, in which no single participant's information may be more than 25% of the metric being benchmarked. In another example, compliance data 208 corresponding to a second constraint may indicate that the peer group includes at least six participants, in which no single participant's information may be more than 30% of the metric being benchmarked and at least three participants' information must be more than 7% of the benchmarked metric. In another example, compliance data 208 corresponding to a third constraint may indicate that the peer group includes at least seven participants, in which no single participant's information may be more than 35% of the metric being benchmarked. Additionally, with respect to the third constraint, at least three participants' information is more than 8% of the benchmarked metric and of these three participants, at least two participants' information is more than 15%. In another example, compliance data 208 corresponding to a fourth constraint may indicate that the peer group includes at least ten participants, in which no single participant's information may be more than 40% of the metric being benchmarked. Additionally, with respect to the fourth constraint, at least three participants' information is more than 10% of the benchmarked metric and of these three participants, at least two participants' information is more than 20%. In yet another example, compliance data 208 corresponding to a fifth constraint may indicate that for reports based on anonymized and aggregated merchant spending the peer group includes at least four participants, and no single participant's information exceeds 35% of the metric being benchmarked. The fifth constraint may be implemented provided that (1) there is a low risk that the data may be reverse engineered, (2) the information could not be used to facilitate anticompetitive (e.g., higher prices, reduced levels of service, coordination among competitors, and the like) if the data were reversed engineered, and (3) third parties are unlikely to complain if the data were successfully reverse engineered.

Figure 3B:
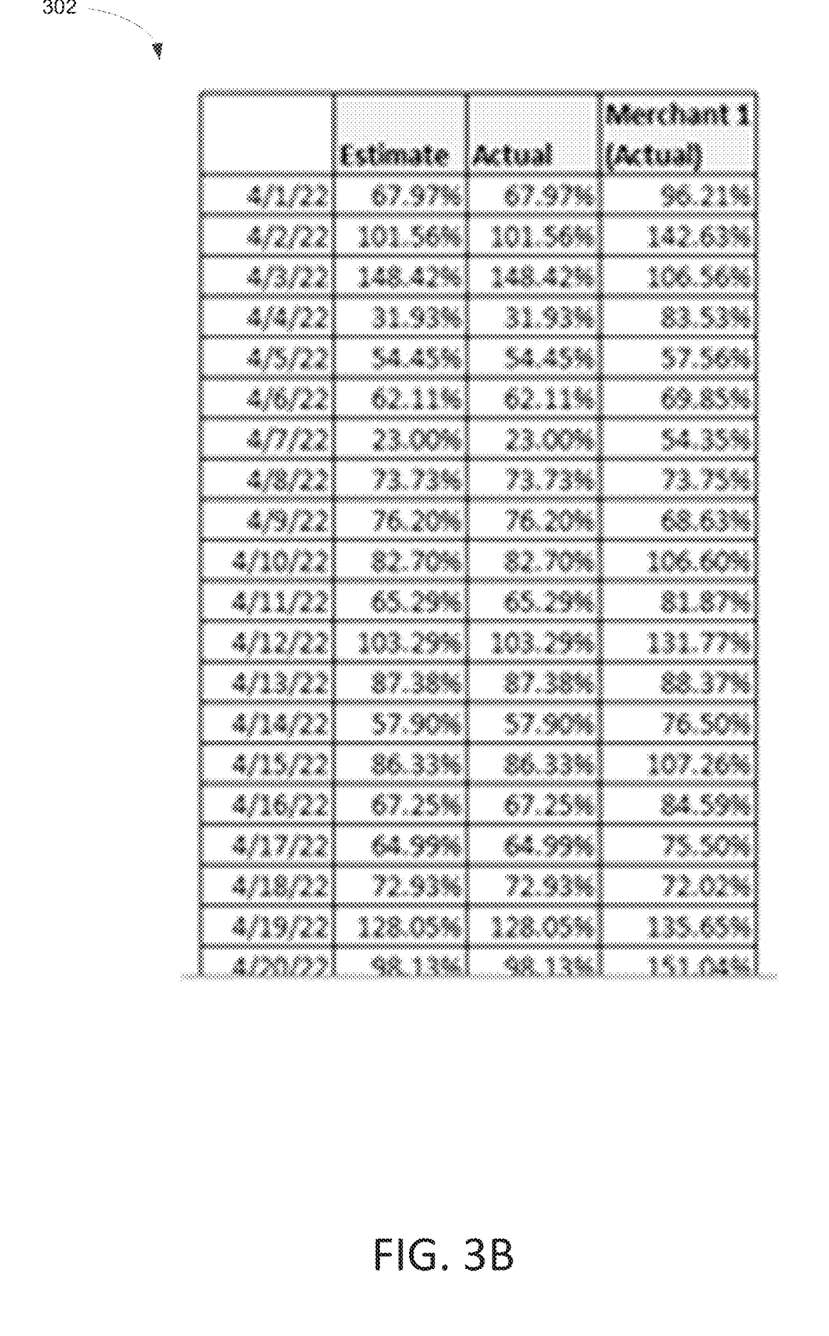
FIG. 3B is a table that illustrates an example of a top merchant's year-over-year sales growth.
Figure 3C:
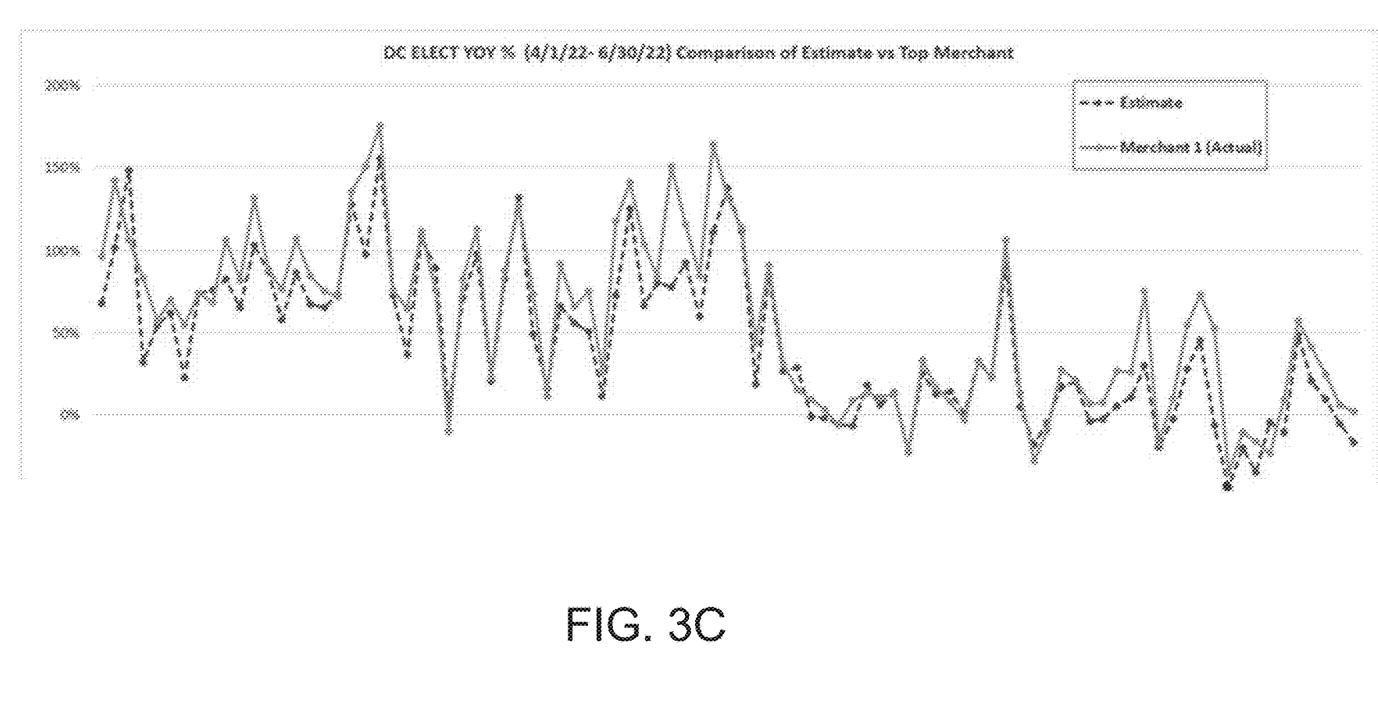
FIG. 3C is a graph of the table illustrated in FIG. 3B comparing an estimate of the top merchant's year-over-year sales growth based on a weighted average to the top merchant's year-over-year actual sales growth.

As an example, with respect to the peer metric data illustrated in table 300, the peer group would violate one or more of the rules associated with the compliance data. For instance, the 88% market shares of merchant 1 violates rules one to five. As illustrated in table 302 in FIG. 3B and the graph of FIG. 3C, the Year over Year (YOY) sales growth of merchant 1 (i.e., the top merchant) by day vs the prior year has a correlation of 0.94 with the overall sector. Merchant 1 can easily be identified since the trends in the graph of FIG. 3C are nearly identical. However, as merchant 1 is so heavily weighted in this peer group, the data and correlations for the remaining merchants within the group are skewed or difficult to identify.

It is noted that FIG. 2 illustrates the peer metric database 202 and the compliance database 204 as being separate databases localized on the database 108; however, it should be understood that the peer metric database 202 and the compliance database 204 may be positioned on the same data storage repository or on different data storage repositories. Moreover, the database 108 may store peer metric data and compliance data in one database or multiple databases.

In one or more cases, the compliance system 102 includes a processing engine 212, and a compliance engine 218. In one or more examples, the processing engine 212 and/or the compliance engine 218 may be implemented in hardware. In one or more examples, the processing engine 212 and/or the compliance engine 218 may be implemented as an executable program maintained in a tangible, non-transitory memory, such as memory 604 of FIG. 6, which may be executed by one or processors, such as processor 602 of FIG. 6.

Figure 4:
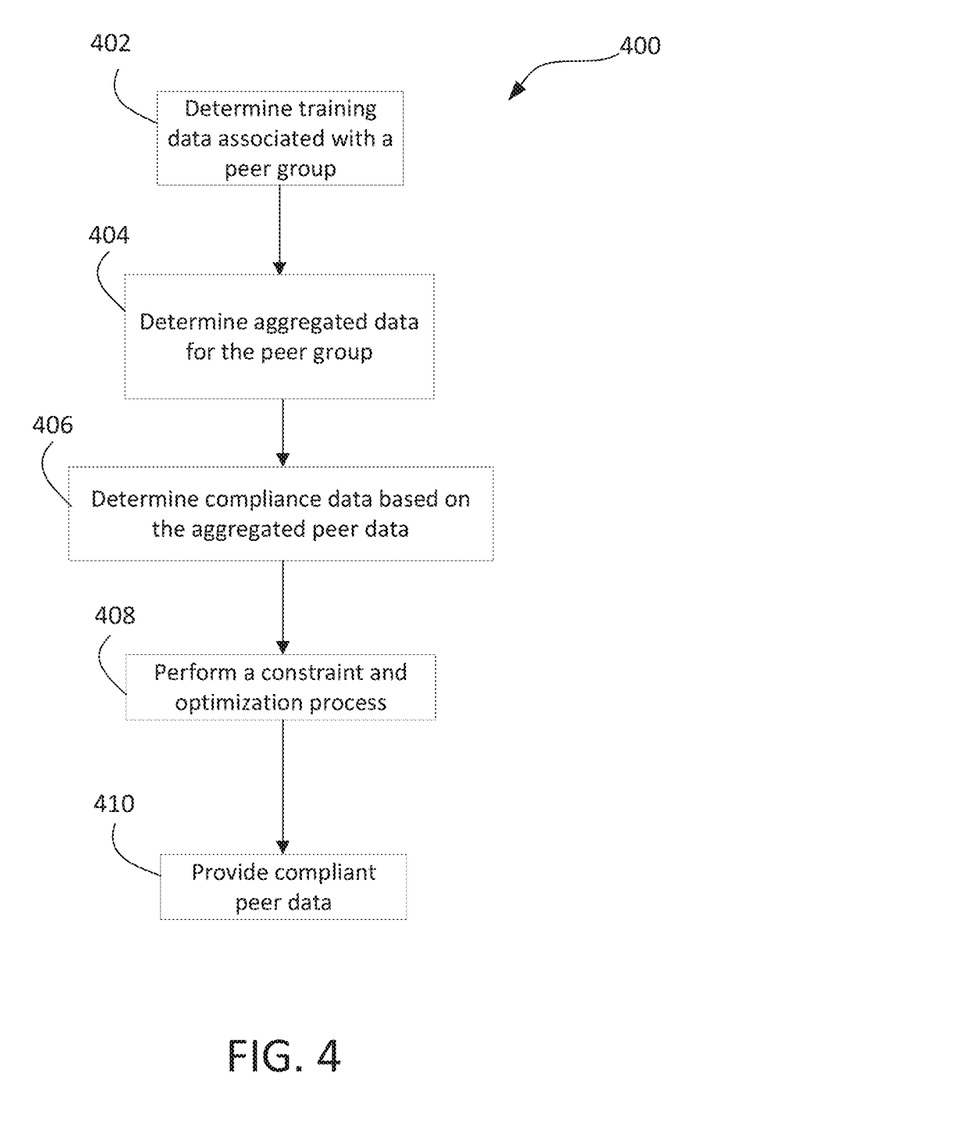
FIG. 4 is a flowchart illustrating a procedure of generating compliant and optimized peer data sets.

FIG. 4 is a flowchart that illustrates a procedure 400 for generating compliant and optimized peer data. One or more portions of the procedure 400 may be performed by one or more computing devices. For example, one or more portions of the procedure 400 may be performed by server device(s) 104. One or more portions of the procedure 400 may be stored in memory as computer-readable or machine-readable instructions that may be executed by a processor of the one or more computing devices. Though portions of the procedure 400 may be described herein as being performed by compliance system, the procedure 400, or portions thereof, may be performed by another computing device or distributed across multiple computing devices, such as one or more client devices and/or one or more server devices. Further, it is noted that, while the examples discussed herein are directed to providing compliant and optimized peer data sets for merchants, the embodiments discussed herein may be used to provide optimized peer data sets for other types of entities, such as healthcare providers, trade groups (e.g., television and media trade groups that may share sales and advertising spot pricing information), or individuals.

Training data is determined (402), preferably by the compliance system 102. In one or more cases, the compliance system 102, determines the training data by retrieving data from the database 108. For example, the compliance system 102 may access a peer metric database, such as peer metric database 202, and identify training data, such as peer metric data 206. The training data may include data associated with a peer group that have one or more comparable attributes to one another. The training data of the peer group associated with merchants may include, for example, but not limited to, geographic locations of the merchants, size of merchants (e.g., big box stores, mom-and-pop stores, and the like), types of merchants (e.g., wholesale merchants, retail merchants, e-commerce merchants, affiliate merchants, and the like), types of goods and/or services offered (e.g., electronic stores, grocery stores, legal services, banking services, healthcare provider services, and the like), merchant categories, and the like. Merchant categories may correspond to one or more of a merchant category code (MCC), a North American Industry Classification System (NAICS) code, a Standard Industrial Classification (SIC) code, and the like. In one or more cases, the training data of the peer group associated with merchants may be consistent with a particular use case that is being analyzed. For instance, a peer group of merchants may be gathered based on an industry sector (e.g., electronic stores, hotels and accommodations, and the like) or, for instance, based on similar lines of business. For example, the compliance system 102 may gather training data associated with merchant 1 through merchant 20, as illustrated in FIG. 3A, based on these merchants having one or more attributes associated with electronic stores in Washington, DC. The compliance system 102 may identify training data associated with the peer group for a period of time. For example, the compliance system 102 may identify training data associated with transactions for the prior year, transactions for one or more sales quarters, and the like. In an example, the training data associated with merchant 1 through 20, as illustrated in FIG. 3A, may correspond to sales data from the second quarter of a particular year. In some cases, the compliance system 102 may filter the peer group training data based on the comparable attributes. In other cases, the compliance system 102 may be manually filtered such that training data for a set of competing merchants may be defined. It is noted that the training data may initially violate one or more of the rules associated with the compliance data.

Aggregated data is determined (404) for the peer group, preferably by the compliance system 102. In one or more cases, the compliance system 102 provides the training data to an aggregation model, such as aggregation model 210. A processing engine, such as processing engine 212 of the compliance system 102, executes the aggregation model 210 to determine the aggregated data for the peer group, such as the aggregated peer data 214. In one or more cases, the compliance system 102 may aggregate the training data via an aggregation method, such as, but not limited to, sum and/or count functions. The compliance system 102 may aggregate the training data associated with each peer in the peer group and an associated time period. For example, the compliance system 102 aggregates sales transactions from the second quarter (Q2) of each merchant of the peer group to determine a total sale amount for each merchant of the peer group. The compliance system 102 determines the market share associated with each merchant of the peer group for the associated time period. For example, the compliance system 102 determines a percentage of sales associated with each merchant of the peer group for Q2.

Compliance data is determined (406), preferably by the compliance system 102. In one or more cases, the compliance system 102 determines the compliance data based on the aggregated peer data. For example, the compliance system 102 may access a compliance database, such as compliance database 204, and identify compliance data that corresponds to one or more attributes of the aggregated peer data 214. The compliance data may be associated with one or more rules to limit a maximum weighted contribution of aggregated peer data associated with one or more peers of the peer group.

Compliance data may correspond to a first constraint that may, for example, indicate that the peer group includes at least five participants, in which no single participant's information may be more than 25% of the metric being benchmarked. In another example, compliance data may correspond to a second constraint that may, for example, indicate that the peer group includes at least six participants, in which no single participant's information may be more than 30% of the metric being benchmarked and at least three participants' information is more than 7% of the benchmarked metric. In another example, compliance data may correspond to a third constraint that may, for example, indicate that the peer group includes at least seven participants, in which no single participant's information may be more than 35% of the metric being benchmarked. Additionally, with respect to the third constraint, at least three participants' information is more than 8% of the benchmarked metric and of these three participants, at least two participants' information is more than 15%. In another example, compliance data may correspond to a fourth constraint that may, for example, indicate that the peer group includes at least ten participants, in which no single participant's information may be more than 40% of the metric being benchmarked. Additionally, with respect to the fourth constraint, at least three participants' information is more than 10% of the benchmarked metric and of these three participants, at least two participants' information is more than 20%. In yet another example, compliance data may correspond to a fifth constraint that may, for example, indicate that for reports based on anonymized and aggregated merchant spending the peer group includes at least four participants, and no single participant's information exceeds 35% of the metric being benchmarked. The fifth constraint may be implemented provided that (1) there is a low risk that the data may be reverse engineered, (2) the information could not be used to facilitate anticompetitive (e.g., higher prices, reduced levels of service, coordination among competitors, and the like) if the data were reversed engineered, and (3) third parties are unlikely to complain if the data were successfully reverse engineered.

In one or more cases, the compliance system 102 determines one or more constraints corresponding to the compliance data to apply to the aggregated data based on the number of participants within the peer group. For instance, the compliance system 102 may determine that there are 20 merchants in the peer group and may select the fourth constraint to apply to the aggregated data. In one or more other cases, the compliance system 102 determines one or more constraints to apply to the aggregated data based on the most relaxed option for weighting the metrics that are being benchmarked.

Having determined the compliance data, a constraint and optimization process is performed (408), preferably by the compliance system 102. In one or more cases, the compliance system 102 provides the aggregated peer data and compliance data to a peer model, such as peer model 216. A compliance engine, such as compliance engine 218 of the compliance system 102, executes the peer model to perform the constraint and optimization process. For example, the compliance engine may determine that compliance data corresponds to the fourth constraint, in which no single participant's information may be more than 40% of the metric being benchmarked, at least three participants' information is more than 10% of the benchmarked metric, and of these three participants, at least two participants' information is more than 20% of the benchmarked metric. As such, the compliance engine may determine the participant that has the highest percentage of a particular attribute within the peer group. For example, based on the compliance data associated with the fourth constraint, the compliance engine chooses merchant 1 as the top merchant within the merchant peer group. The compliance engine may determine merchant 1 as the top merchant of the merchant peer group based on sales transactions for the time period associated with the peer metric data, such as, for example, sales transactions and/or market share occurring in Q2. For instance, merchant 1 may have sales of $12,356,575 for Q2, accounting for 88% of the market share for the merchant peer group.

Having determined the top peer in the peer group, the compliance engine may apply, via the peer model, the compliance data to the peer metric data associated with the top peer. As such, the concentration of aggregated peer data associated with the top peer is reduced to be compliant with the associated compliance data. For example, the compliance engine may limit the maximum weighted contribution of merchant 1 to, for example, 40% based on the compliance data associated with the fourth constraint. In one or more cases, the compliance engine may implement an additional constraint in the peer model such that the sum of the maximum weighted contributions of all peers within the peer group (e.g., merchant 1 to merchant 20) equals 100%. Having limited the maximum weighted contribution of the top peer (e.g., merchant 1) to the associated compliance data (e.g., 40%), the compliance engine may determine the optimum weighted contributions for the remaining peers (e.g., merchants 2 to merchant 20) within the peer group based on the associated compliance data. For example, the compliance engine may determine the optimum weighted contributions for the remaining merchants, in which at least three merchants' information is more than 10% of the benchmarked metric and of these three merchants, at least two merchants' information is more than 20%.

The compliance engine may determine the optimum weighted contributions for the remaining peers by iteratively determining coefficients that satisfy the compliance data. In one or more cases, the compliance engine may determine the optimum weighted contributions for the remaining peers by iteratively determining the coefficients that satisfy the compliance data while minimizing the sum-of-squares between the aggregated peer data (e.g., the sales transactions and/or market share occurring in Q2) and the constrained aggregated peer data (e.g., weighted sales transactions and/or market share occurring in Q2 of the merchants within the merchant peer group). The compliance engine may minimize the sum-of-squares to maintain as much correlation between the aggregated peer data and the constrained aggregated peer data within the associated time period. That is, by providing the optimum weighted contributions for the remaining peers while minimizing the sum-of-squares between the aggregated peer data and the constrained aggregated peer data, the compliance system 102 may provide, via the peer model, modeled peer data that retains a high correlation with the actual sector, while diminishing the correlation to the data associated with the top peer.

Figure 5A:
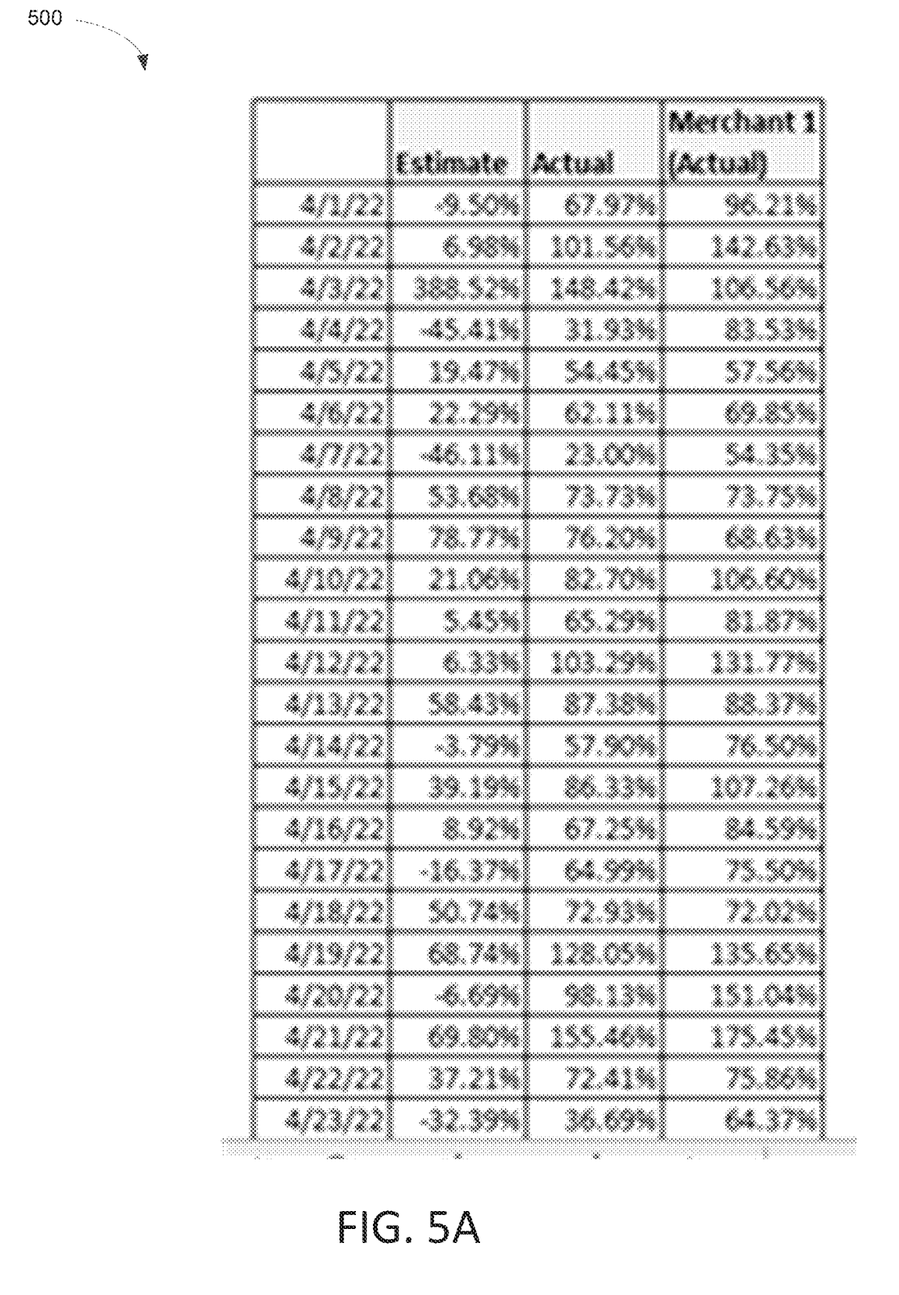
FIG. 5A is a table that illustrates example compliant peer data.
Figure 5B:
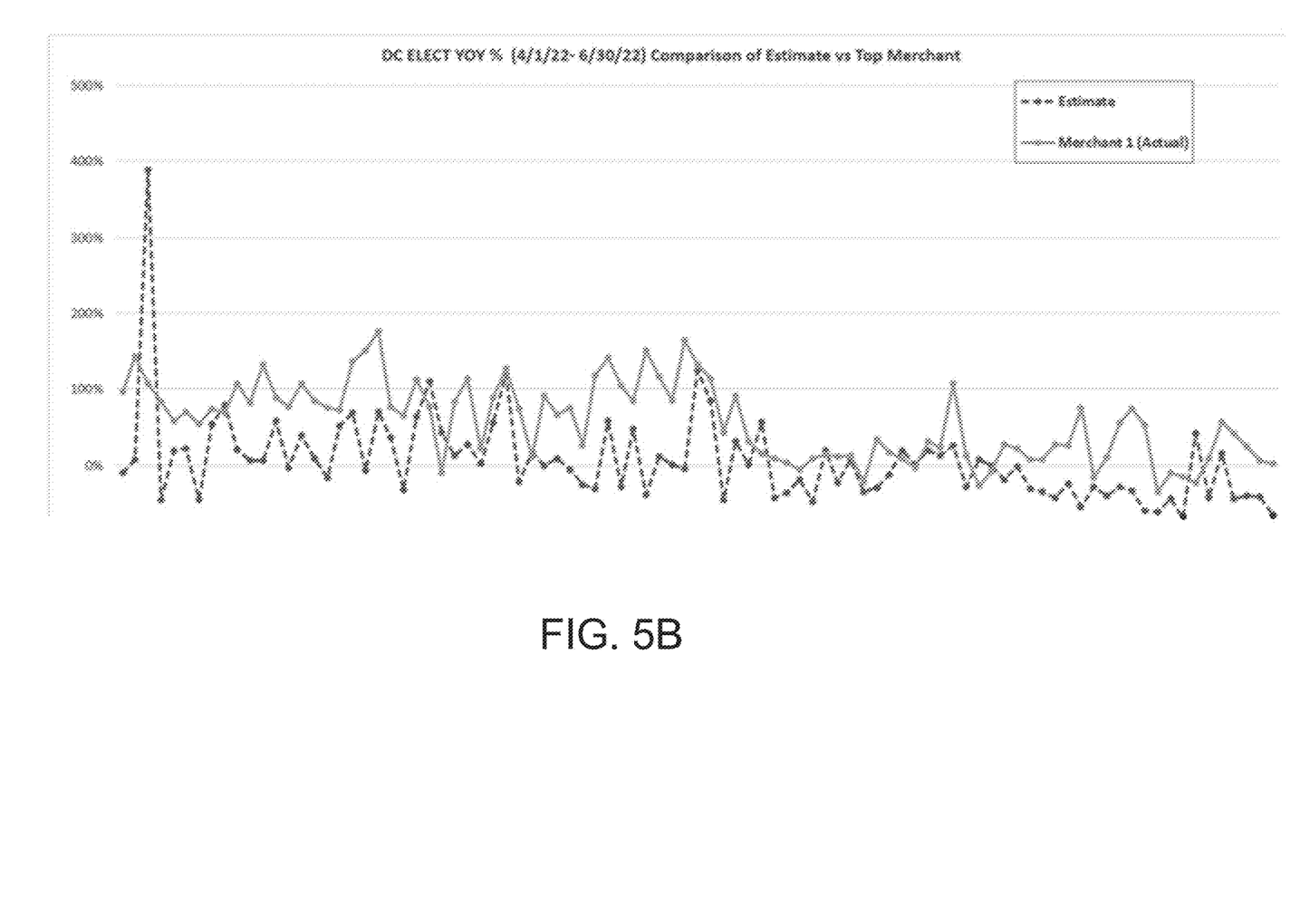
FIG. 5B is a graph of data from the table illustrated in FIG. 5A comparing compliant peer data to the top merchant's actual sales during a corresponding time period.
Figure 5C:
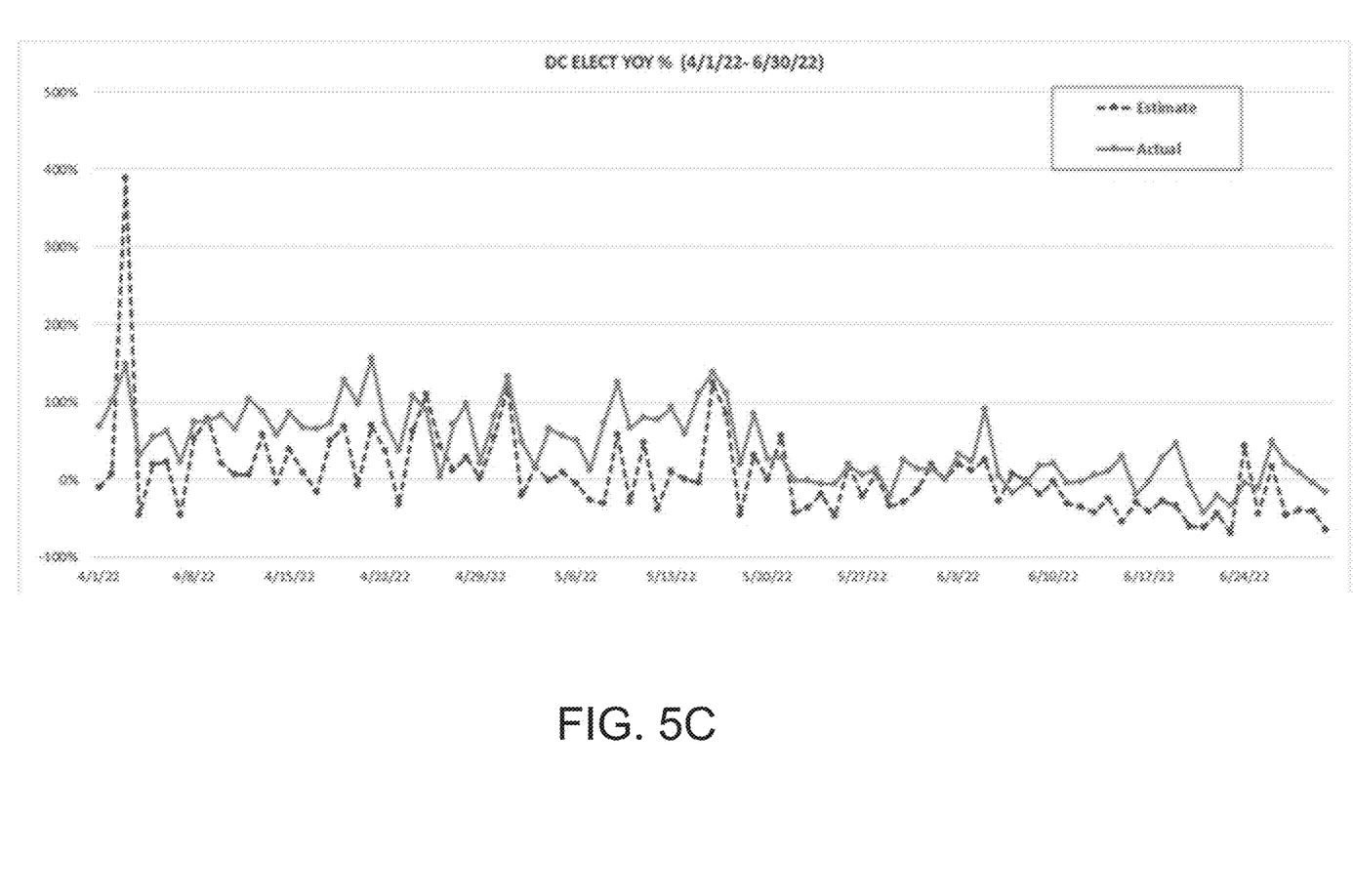
FIG. 5C is a graph of data from the table illustrated in FIG. 5A correlating estimated peer data and compliant peer data.

Compliant peer data is provided (410), preferably by the compliance system 102. In one or more cases, the compliance system 102 may provide complaint peer data based on the constrained peer data of the top peer and the optimum weighted contributions of the remaining peers within the peer group. For example, FIG. 5A illustrates a table 500 of a comparison of market shares of sales transactions for the top merchant in the corresponding merchant peer group for a portion of Q2 (e.g., Apr. 1, 2022 to Apr. 23, 2022). The actual column of table 500 provides results of real data of a year-over-year percentage change for the associated time period (e.g., Q2) for the peer group. The Merchant 1 (Actual) column provides the results of real data of a year-over-year percentage change for the associated time period for Merchant 1. The estimate column of table 500 provides results of compliant peer data of a year-over-year percentage change for the associated time period based on the constrained peer data of the top peer and the optimum weighted contributions of the remaining peers within the peer group. FIG. 5B illustrates a graph of results of table 500 comparing the year-over-year percentage change for Merchant 1's real data to the estimated compliant peer data between Apr. 1, 2022 and Jun. 30, 2022. FIG. 5C illustrates a graph of results of table 500 comparing the year-over-year percentage change for real data of the peer group to the estimated compliant peer data between Apr. 1, 2022 and Jun. 30, 2022. As illustrated in FIG. 5C, the estimated compliant peer data is reasonably well correlated (e.g., having a correlation score of 0.66) to the actual peer data. That is, the compliance system 102 provided, via the peer model, modeled peer data that retained a high correlation with the real merchant data, while diminishing the correlation to the real data associated with merchant 1.

In some cases, the compliance system 102 may provide the complaint peer data as a generated report. For example, the compliance system 102 may provide and display the compliant peer data as a line graph illustrating the modeled peer data over the corresponding period of time (e.g., Q2). In other cases, the compliance system 102 may provide the complaint peer data as input to an interactive application, such as compliance application 110 or integrated with another application. By providing the compliant peer data to the interactive application, the interactive application may display the compliant peer data on an interface, such that a user may filter and view the modeled peer data based on one or more attributes, such as, but not limited to, geography, a time period, particular individuals, and the like. For example, the user may provide advertisements to a variety of merchants. The user may interact with the application to display data, such as sales transaction, associated with, for example, electronic stores within the Washington, DC metro area during Q2 of 2022. The application may, for example, display modeled peer data of sales transactions during Q2 of 2022 for electronic stores located within the Washington, DC metro area. In conventional data extraction and analysis products, a user may filter to certain attributes; however, due to compliance regulations, the actual data is not able to be displayed or the data that is displayed is skewed by a handful of peers. For instance, conventional data extraction and analysis products may illustrate a map of sales for counties in the United States. However, counties which are dominated by a handful of peers may not be shown as the peer data for sales within a specific county may not be compliant with current regulations. In contrast to conventional products, the compliance system 102 may provide an on-the-fly ability to generate compliant peer data, such that all information may meet compliance regulations and be displayed and visible to a user.

Figure 6:
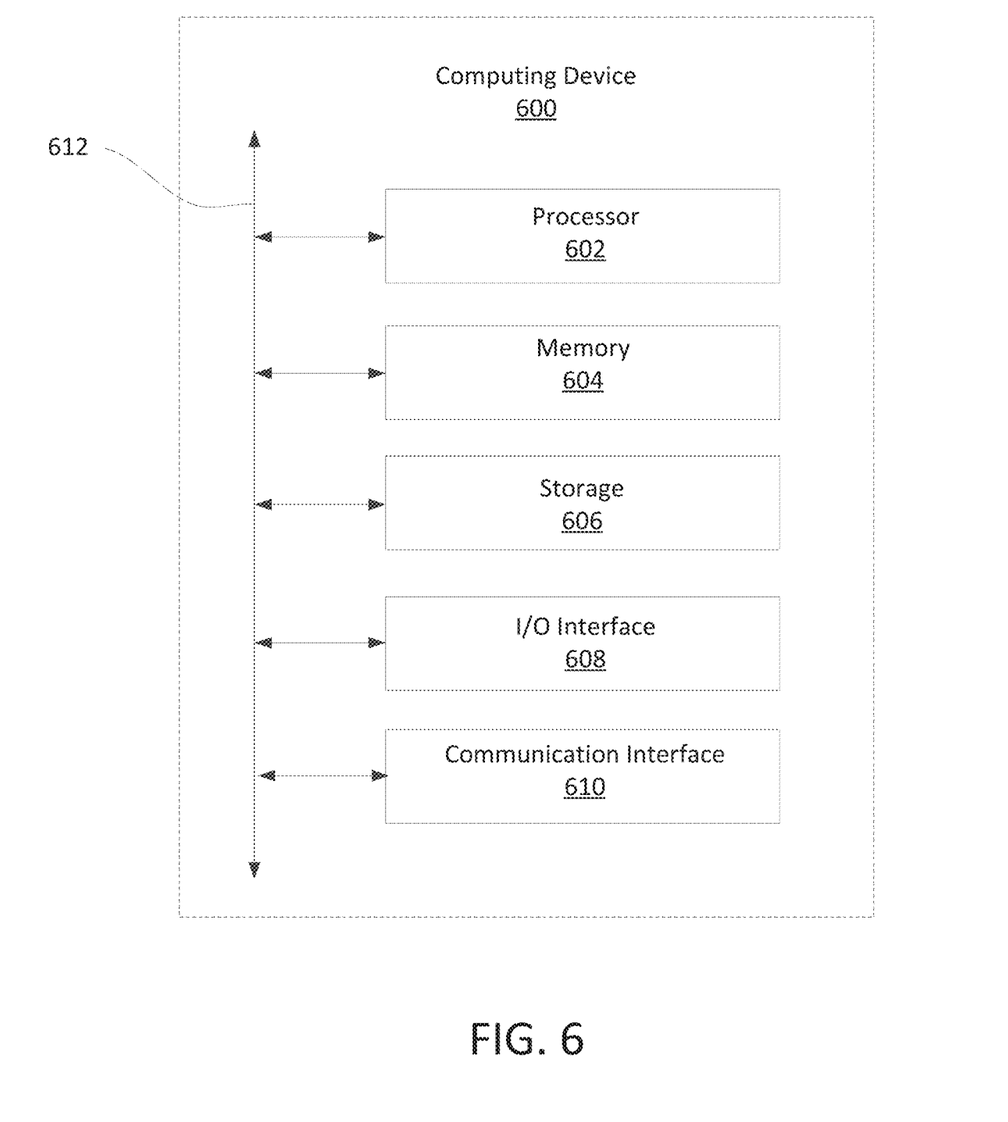
FIG. 6 is a block diagram of an example computing device.

FIG. 6 is a block diagram illustrating an example computing device 600. One or more computing devices such as the computing device 600 may implement one or more features for generating and/or optimizing peer set data, as described herein. For example, the computing device 600 may comprise the client device 112 and/or the server device(s) 102 shown in FIG. 1. As shown by FIG. 6, the computing device 600 may comprise a processor 602, a memory 604, a storage device 606, an I/O interface 608, and/or a communication interface 610, which may be communicatively coupled by way of a communication infrastructure 612. It should be appreciated that the computing device 600 may include fewer or more components than those shown in FIG. 6.

The processor 602 may include hardware for executing instructions, such as those making up a computer program. In examples, to execute instructions for dynamically modifying workflows, the processor 602 may retrieve (or fetch) the instructions from an internal register, an internal cache, the memory 604, or the storage device 606 and decode and execute the instructions. The memory 604 may be a volatile or non-volatile memory used for storing data, metadata, computer-readable or machine-readable instructions, and/or programs for execution by the processor(s) for operating as described herein. The storage device 606 may include storage, such as a hard disk, flash disk drive, or other digital storage device, for storing data or instructions for performing the methods described herein.

The I/O interface 608 may allow a user to provide input to, receive output from, and/or otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. The I/O interface 608 may be configured to provide graphical data to a display for presentation to a user. The graphical data may be representative of one or more graphical user interfaces and/or any other graphical content.

The communication interface 610 may include hardware, software, or both. In any event, the communication interface 610 may provide one or more interfaces for communication (such as, for example, packet-based communication) between the computing device 600 and one or more other computing devices or networks. The communication may be a wired or wireless communication. As an example, and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 610 may facilitate communications with various types of wired or wireless networks. The communication interface 610 may also facilitate communications using various communication protocols. The communication infrastructure 612 may also include hardware, software, or both that couples components of the computing device 600 to each other. For example, the communication interface 610 may use one or more networks and/or protocols to enable a plurality of computing devices connected by a particular infrastructure to communicate with each other to perform one or more aspects of the processes described herein. To illustrate, the compliant and optimized peer data set generation process may allow a plurality of devices (e.g., a client device and server device(s)) to exchange information, such as compliant peer set data.

In addition to what has been described herein, the methods and systems may also be implemented in a computer program(s), software, or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

Although the embodiments discussed herein are described with reference to the figures, it will be appreciated that many other ways of performing the acts associated with the embodiments can be used. For example, the order of some operations may be changed, and some of the operations described may be optional.

In addition, the embodiments described herein can be at least partially implemented in the form of computer-implemented processes and apparatus. The disclosed embodiments may also be at least partially implemented in the form of tangible, non-transitory machine-readable storage media encoded with computer program code. For example, the processes described herein can be implemented in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the embodiments. The embodiments may also be at least partially implemented in the form of a computer into which computer program code is loaded or executed, such that, the computer becomes a special purpose computer for practicing the embodiments. When implemented on a general-purpose processor, the computer program code segments configure the processor to create specific logic circuits. The embodiments may alternatively be at least partially implemented in application specific integrated circuits for performing the embodiments.

The foregoing is provided for purpose of illustrating, explaining, and describing embodiments of this disclosure. Modifications and adaptations to the embodiments will be apparent to those skilled in the art and may be made without departing from the scope or spirit of the disclosure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A computer-implemented method to generate compliant and optimized peer data, the method comprising:
determining training data associated with a group of peers and a time period, the group of peers having one or more comparable attributes and the training data comprising one or more metrics;
aggregating the training data associated with each peer of the peer group to determine a share of the metric associated with each peer of the peer group;
determining compliance data based on the aggregated training data, the compliance data being associated with a constraint that limits a weighted contribution of aggregated training data associated with one peer;
applying the constraint of aggregated training data associated with the peer to limit the weighted contribution of aggregated training data associated with the peer to determine compliant peer data;
determining weighted contributions of aggregated training data associated with the remaining peers of the peer group; and
generating and providing the compliant peer data to an application, wherein the compliant peer data is generated based on the limited weighted contribution of aggregated training data associated with the peer and the weighted contributions of aggregated training data associated with the remaining peers of the peer group, and wherein the application is configured to display the compliant peer data.

2. The computer-implemented method of claim 1, wherein the one or more comparable attributes comprise one or more of a geographic location, a merchant category code, a North American Industry Classification System, and a Standard Industrial Classification.

3. The computer-implemented method of claim 1, wherein the share of the metric comprises a percentage of training data associated with a respective peer of the peer group.

4. The computer-implemented method of claim 1, wherein the constraint associated with the compliance data limits a maximum weighted contribution of aggregated training data associated with a peer having the largest share of the metric of the peer group.

5. The computer-implemented method of claim 1, wherein the compliance data comprises one constraint that limits a maximum weighted contribution of aggregated training data associated with a peer having the largest share of the metric of the peer group and at least one other constraint that limits a weighted contribution of aggregated training data associated with another peer of the peer group.

6. The computer-implemented method of claim 5, wherein the other peer of the peer group is associated with the aggregated training data having the second largest share of the metric of the peer group.

7. The computer-implemented method of claim 1, wherein determining the weighted contributions of the aggregated training data associated with the remaining peers of the peer group comprises determining optimum weighted contributions for the remaining peers that maintain a correlation between the aggregated training data and the compliant peer data.

8. The computer-implemented method of claim 7, wherein determining optimum weighted contributions for the remaining peers comprises iteratively determining coefficients that correspond to one or more constraints associated with the compliance data.

9. A compliance apparatus configured to generate compliant and optimized peer data, comprising:
a memory configured to store instructions; and
at least one processor coupled to the memory, the at least one processor configured to execute the instructions to:
determine training data associated with a group of peers and a time period, the group of peers having one or more comparable attributes and the training data comprising one or more metrics;
aggregate the training data associated with each peer of the peer group to determine a share of the metric associated with each peer of the peer group;
determine compliance data based on the aggregated training data, the compliance data being associated with a constraint that limits a weighted contribution of aggregated training data associated with one peer;
apply the constraint of aggregated training data associated with the peer to limit the weighted contribution of aggregated training data associated with the peer to determine compliant peer data;
determine weighted contributions of aggregated training data associated with the remaining peers of the peer group; and
generate and provide the compliant peer data to an application, wherein the compliant peer data is generated based on the limited weighted contribution of aggregated training data associated with the peer and the weighted contributions of aggregated training data associated with the remaining peers of the peer group, and wherein the application is configured to display the compliant peer data.

10. The compliance apparatus of claim 9, wherein the one or more comparable attributes comprise one or more of a geographic location, a merchant category code, a North American Industry Classification System, and a Standard Industrial Classification.

11. The compliance apparatus of claim 9, wherein the share of the metric comprises a percentage of training data associated with a respective peer of the peer group.

12. The compliance apparatus of claim 9, wherein the constraint associated with the compliance data limits a maximum weighted contribution of aggregated training data associated with a peer having the largest share of the metric of the peer group.

13. The compliance apparatus of claim 9, wherein the compliance data comprises one constraint that limits a maximum weighted contribution of aggregated training data associated with a peer having the largest share of the metric of the peer group and at least one other constraint that limits a weighted contribution of aggregated training data associated with another peer of the peer group.

14. The compliance apparatus of claim 13, wherein the other peer of the peer group is associated with the aggregated training data having the second largest share of the metric of the peer group.

15. The compliance apparatus of claim 9, wherein the at least one processor is further configured to determine weighted contributions of the aggregated training data associated with the remaining peers of the peer group by determining optimum weighted contributions for the remaining peers that maintain a correlation between the aggregated training data and the compliant peer data.

16. The compliance apparatus of claim 15, wherein the at least one processor is further configured to determine optimum weighted contributions for the remaining peers comprises iteratively determining coefficients that correspond to one or more constraints associated with the compliance data.

17. A computer program product comprising:
a non-transitory computer readable medium having program instructions stored thereon, the program instructions executable by one or more processors, the program instructions comprising:
determining training data associated with a group of peers and a time period, the group of peers having one or more comparable attributes and the training data comprising one or more metrics;
aggregating the training data associated with each peer of the peer group to determine a share of the metric associated with each peer of the peer group;
determining compliance data based on the aggregated training data, the compliance data being associated with a constraint that limits a weighted contribution of aggregated training data associated with one peer;
applying the constraint of aggregated training data associated with the peer to limit the weighted contribution of aggregated training data associated with the peer to determine compliant peer data;
determining weighted contributions of aggregated training data associated with the remaining peers of the peer group; and
generating and providing the compliant peer data to an application, wherein the compliant peer data is generated based on the limited weighted contribution of aggregated training data associated with the peer and the weighted contributions of aggregated training data associated with the remaining peers of the peer group, and wherein the application is configured to display the compliant peer data.

18. The computer program product of claim 17, wherein the constraint associated with the compliance data limits a maximum weighted contribution of aggregated training data associated with a peer having the largest share of the metric of the peer group.

19. The computer program product of claim 17, wherein the compliance data comprises one constraint that limits a maximum weighted contribution of aggregated training data associated with a peer having the largest share of the metric of the peer group and at least one other constraint that limits a weighted contribution of aggregated training data associated with another peer of the peer group.

20. The computer program product of claim 17, wherein determining the weighted contributions of the aggregated training data associated with the remaining peers of the peer group comprises determining optimum weighted contributions for the remaining peers that maintain a correlation between the aggregated training data and the compliant peer data.

* * * * *